(12) United States Patent
Wang

(10) Patent No.: US 8,087,720 B2
(45) Date of Patent: Jan. 3, 2012

(54) VEHICLE CLOSURE PANEL ASSEMBLY AND METHOD

(75) Inventor: Pei-Chung Wang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 12/235,754

(22) Filed: Sep. 23, 2008

(65) Prior Publication Data

US 2010/0072785 A1 Mar. 25, 2010

(51) Int. Cl.
*B62D 25/12* (2006.01)
*B23P 11/00* (2006.01)
(52) U.S. Cl. .................. 296/193.11; 29/509; 29/525.13
(58) Field of Classification Search ............ 296/193.11, 296/193.04, 193.09, 193.01, 187.01; 29/897.9, 29/509, 525.13
See application file for complete search history.

(56) References Cited

U.S. PATENT DOCUMENTS

| | | | |
|---|---|---|---|
| 3,680,910 A * | 8/1972 | Stanner | 296/29 |
| 3,861,339 A | 1/1975 | Aida et al. | |
| 4,569,880 A * | 2/1986 | Nishiyama et al. | 428/212 |
| 5,403,062 A * | 4/1995 | Sjostedt et al. | 296/181.3 |
| 5,605,371 A * | 2/1997 | Borchelt et al. | 296/187.09 |
| 5,948,185 A * | 9/1999 | Krajewski et al. | 148/698 |
| 6,257,043 B1 * | 7/2001 | Wiens | 72/412 |
| 7,007,368 B2 * | 3/2006 | Sovoda | 29/509 |
| 7,051,566 B2 * | 5/2006 | Baulier et al. | 72/306 |
| 7,422,652 B2 | 9/2008 | Ondrus et al. | |
| 2005/0102817 A1 * | 5/2005 | Sovoda | 29/509 |
| 2007/0257518 A1 * | 11/2007 | Matsushima et al. | 296/193.11 |

FOREIGN PATENT DOCUMENTS

| | | | |
|---|---|---|---|
| CN | 101169027 A | 4/2008 | |
| DE | 102006033751 B4 | 1/2008 | |
| JP | 2075420 A | 3/1990 | |
| JP | 10128468 A | 5/1998 | |

OTHER PUBLICATIONS

Asperity, from Wikipedia, the free encyclopedia http://en.wikipedia.org/wiki/Asperities, 2010.*
Epoxy, from Wikipedia, the free encyclopedia http://en.wilipedia.org/wiki/Epoxy, 2010.*

* cited by examiner

*Primary Examiner* — Glenn Dayoan
*Assistant Examiner* — Sunsurraye Westbrook
(74) *Attorney, Agent, or Firm* — Quinn Law Group, PLLC

(57) ABSTRACT

A closure panel assembly includes an inner and an outer panel, the inner panel having a crimped edge surface feature and a textured surface feature such as a set of radial projections or asperities. Adhesive material is applied between the panels, and the outer panel is hemmed and adhesively bonded to the inner panel. The surface features affix the panels together without induction or intermediate heat curing of the adhesive material. The outer panel has a hemmed edge enclosing the crimped surface feature, with the adhesive material positioned therebetween to form a seal of a relatively low shrinkage rate. A method of forming the closure panel assembly includes forming a first and second surface feature on the inner panel, such as by using swaging and coining, respectively, applying adhesive material therebetween, and hemming the panels to form a hem seam.

16 Claims, 2 Drawing Sheets

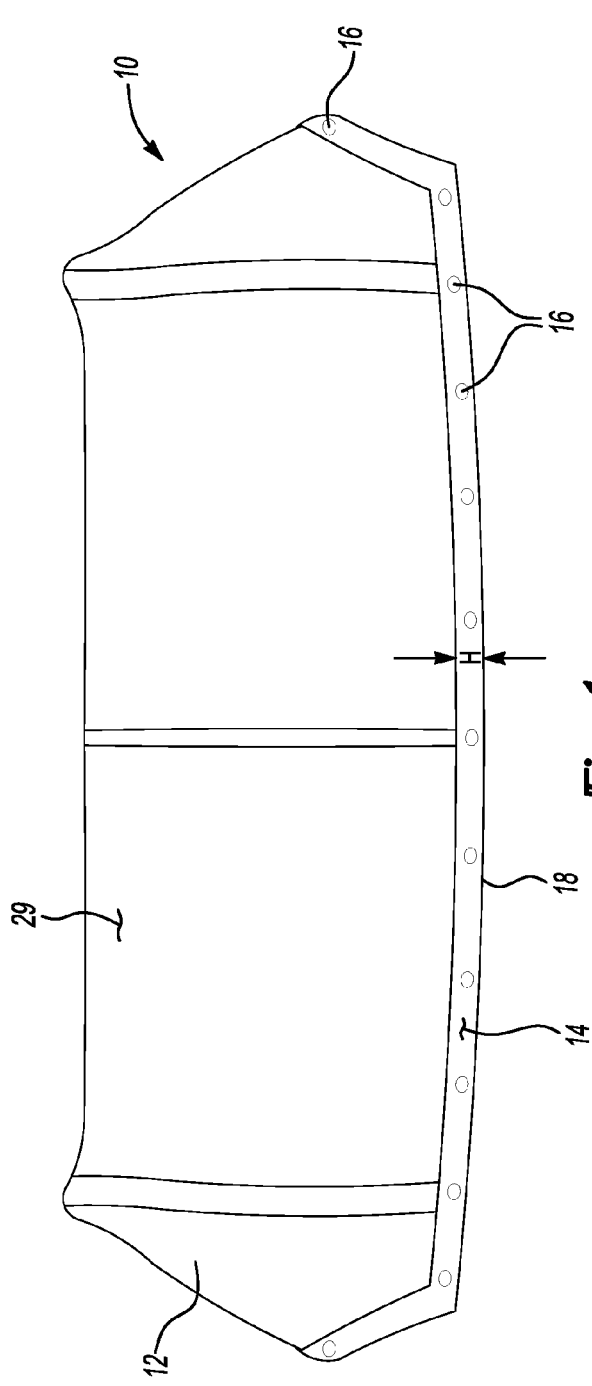
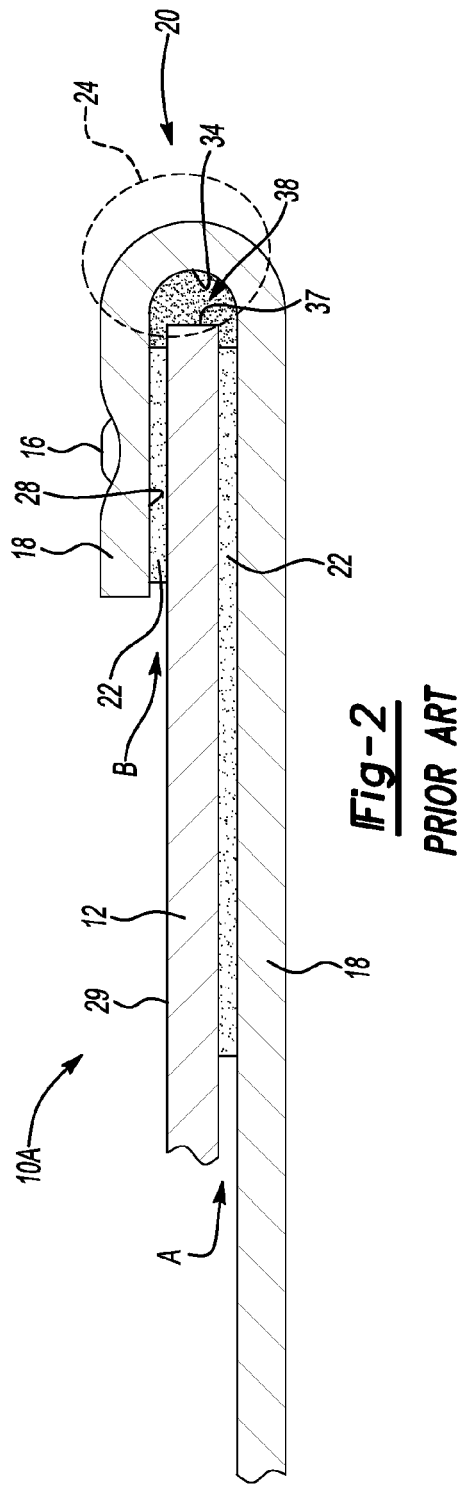
Fig-1
Fig-2 PRIOR ART

VEHICLE CLOSURE PANEL ASSEMBLY AND METHOD

TECHNICAL FIELD

The present invention relates generally to a closure panel assembly and a method of fabricating the same, and more particularly to a hemmed closure panel assembly that is fabricated using combined processes of hemming and adhesive bonding of adjacent closure panels without induction, intermediate, or other heat curing of the fabricated closure panel assembly.

BACKGROUND OF THE INVENTION

Various fabrication methods or processes exist for forming a vehicle hood, trunk, door panel, or other vehicle closure panel assembly. One of the more common fabrication processes is adhesive bonding. Using an adhesive bonding process, a layer of partially viscous bonding or adhesive material is dispensed on mating surfaces of adjacent closure panels which are ordinarily constructed of sheet metal. The closure panels can then be joined or welded together via one or more resistance welding techniques. Intense heat from the resistance welding process to some extent helps to locally cure the adhesive material in proximity to the resultant weld joint, with the remaining areas of the weld joint being purely adhesively bonded. The adhesive material is cured via subsequent heat curing and paint baking processes. In comparison to a weld joint formed exclusively via resistance welding techniques, adhesive bonding provides an improved fatigue performance and increased flexibility at or along the weld joint, irrespective of whether the closure panel assembly itself is constructed of like or of different materials.

However, despite the known benefits of adhesive bonding, conventional adhesive bonding techniques can be less than optimal when used in the fabrication of certain types of closure panel assemblies. For example, an adhesively-bonded vehicle hood panel assembly typically uses a fabrication process widely referred to as "hemming". As will be understood by those of ordinary skill in the art, the term "hemming" describes the process of folding or bending one closure panel or sheet into or back onto itself, or into or onto an adjacently positioned closure panel. The adhesive/sealer material is dispensed or applied to one or both of the adjacent closure panels prior to the hemming process to add additional bonding strength. After hemming is complete, the bonded closure panel assembly is cured at an elevated temperature, usually by heating the bonded closure panel assembly in an induction or intermediate curing station and/or a paint baking oven.

Once the bonded and cured closure panel assembly is allowed to cool to room temperature, certain residual stresses can form or result in the materials of construction, e.g., an outer sheet metal panel. In some materials, such as in aluminum-to-aluminum bonding typical of a vehicle hood panel assembly and certain other vehicular closure panel structures, some level of perceptible surface distortion can result, with the distortion potentially leading to a less than optimal appearance at those portions or areas of the panel assembly most susceptible to the residual stresses.

SUMMARY OF THE INVENTION

Accordingly, an optimized closure panel assembly is provided along with a method for optimizing a fabrication process used to form such an assembly. As exemplified herein, a closure panel assembly can be configured as a vehicle closure panel assembly, e.g., a hood panel assembly, a trunk panel assembly, a door panel assembly, etc. However, those of ordinary skill in the art will recognize that other non-vehicular closure panel assemblies utilizing concurrent hemming and adhesive bonding processes during fabrication can also be improved using the assembly and method of the invention, and therefore the invention is not limited in scope to vehicular panel assemblies.

Both the assembly and the method are intended to eliminate the induction or intermediate curing stage of the closure panel fabrication process as described above, thus eliminating any associated tooling investment while minimizing instances of heat curing-induced distortion of particular portions or exposed surface areas of the fabricated closure panel assembly. However the closure panel assembly is ultimately embodied, it includes a first or inner panel and a second or outer panel, with the first and second panels positioned adjacently to each other and then hemmed to form a hem seam around the perimeter of the closure panel assembly. That is, a portion of the outer panel is bent, folded, or otherwise hemmed back onto or at least partially around the perimeter of the inner panel to form the hem seam, along with adhesive/sealer bonding at the hem seam as described above.

Within the scope of the invention, prior to the hemming process various surfaces of the inner panel are subjected to a different predetermined deformation process in order to create predetermined surface features on the inner panel. A textured surface formed or provided on one surface of the inner panel provides a frictional interface between the inner and outer panels, thus increasing the friction level and bonding strength at or along the interfaces between the inner and outer panels relative to a baseline friction level provided by a conventionally bonded and induction cured panel assembly. Also prior to hemming, a layer of adhesive/sealer material is dispensed or applied between the adjacent panels. Once the outer panel is hemmed with respect to the inner panel to form the hem seam, the textured surface feature and a crimped edge surface feature secure or affix the inner and outer panels together without requiring the conventionally-applied subsequent step of induction or intermediate curing prior to any final paint baking operation.

In particular, a closure panel assembly such as a vehicle hood panel, trunk panel, door panel, etc., includes the inner panel and outer panel described above. The inner panel has a textured surface feature, such as a series or set of radial projections, surface asperities, or another relatively high-friction surface finish or texture. The inner panel also has a crimped edge surface feature, which can be swaged or otherwise deformed to increases the diameter or thickness of an edge of the inner panel. A layer of adhesive/sealer material is dispensed or applied to either or both of the inner and outer panels at the interfaces therebetween. The outer panel is folded, bent, or otherwise hemmed back onto or around the first panel. Because of the textured and crimped surface features, the need for any induction or intermediate curing of the adhesive material in the conventional manner is eliminated.

A method of forming such a closure panel assembly includes forming textured and crimped edge surface features on a first or inner panel, applying a layer of adhesive/sealer material to the first and/or the second panels at the interface between the panels, and folding, bending, or otherwise hemming the second panel to the first panel to form a hem seam. However configured or shaped, the first and second surface features act to increase the friction level at or along the interfaces between the first and second panels relative to a baseline friction level of a conventionally bonded or weld bonded and induction cured closure panel, thus affixing, securing, or attaching the first panel to the second panel at or along the hem seam without the need for heat curing of the adhesive material.

According to one embodiment, the forming of the crimped edge surface feature can include subjecting an edge of the first panel to a swaging process, i.e., by interposing the first panel between respective portions of a swaging block or die and then hammering, adapting, or otherwise shaping the first panel to thereby form a series of suitable radial projections or asperities. Forming the textured surface feature can include subjecting a surface of the first panel to a concurrent or separate coining process to thereby provide the first panel with a set of radial projections or other desired surface asperity. If necessary, the method can optionally include resistance welding of the first and second panels, such as by spot welding at a plurality of discrete weld joints at or along the hem seam, to further increase the strength of the fabricated closure panel assembly.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an exemplary vehicle closure panel assembly;

FIG. 2 is a prior art schematic cross-sectional side view of a closure panel assembly showing areas of potentially increased residual stress;

DESCRIPTION OF THE PREFERRED EMBODIMENTS

Figure 3:
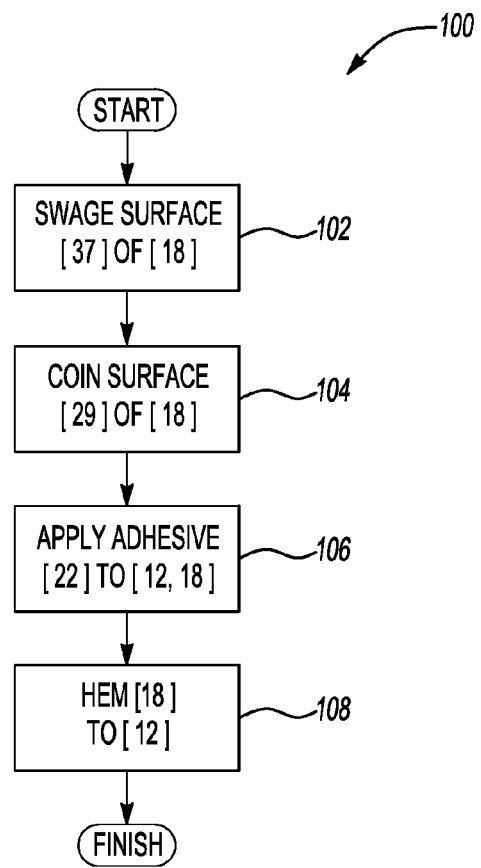
FIG. 3 is a flow chart describing a process or method for fabricating the closure panel assembly exemplified in FIG. 1.

With reference to the Figures, wherein like reference numerals refer to like or similar components throughout the several figures, and beginning with FIG. 1, a closure panel assembly 10 includes a first or inner panel 12 and a second or outer panel 18. The closure panel assembly 10 of FIG. 1 is configured as an exemplary hood panel assembly for use with a vehicle (not shown), although other vehicular and non-vehicular closure panel assemblies can also be used within the scope of the invention. For example, the closure panel assembly 10 can be embodied as a trunk panel or door panel assembly for a vehicle or a non-vehicular object, or any other panel assembly in which one sheet metal panel is placed adjacent to another and subjected to a hemming process as described above.

However configured, the closure panel assembly 10 includes a hem seam 14 having a width H. The hem seam 14 is formed by folding, bending, or otherwise hemming the outer panel 18 with respect to the inner panel 12. After hemming, if necessary the hem seam 14 can be resistance-welded to further increase the durability and bond strength between the panels 12, 18. However, adhesive bonding alone, in some embodiments, can be used without departing from the scope of the invention. For example, a series of discrete spot-welds 16 can be used around the perimeter of the hem seam 14, with the spot welds 16 being approximately equally spaced. Likewise, the hem seam 14 can be continuously welded around its perimeter using, by way of example, laser welding, arc welding, or other continuous welding techniques. The inner panel 12 and the outer panel 18 can each be constructed of similar or different types of sheet metal. When the closure panel assembly 10 is configured as a vehicle hood panel assembly in particular, as shown in FIG. 1, the panels 12, 18 can be constructed substantially or entirely of aluminum or other suitable light weight metal.

Referring to prior art FIG. 2, a closure panel assembly 10A is shown in cross-sectional side view to show in more detail the interrelation of the various layers after hemming and weld bonding have been completed according to a conventional process or method. A layer of adhesive material 22 is dispensed or applied between the inner panel 12 and the outer panel 18, with the hem seam 14 formed by folding, bending, wrapping, or otherwise hemming the outer panel 18 with respect to the inner panel 12. If necessary, spot-welds 16 are formed on the exposed outer panel 18 to further bond the panels 12, 18.

The hemming process forms a hemmed edge 20 having a bent inner wall or surface 34. The hem seam 14 at least partially encloses an edge surface 37 of the first panel 12 adjacent to the inner surface 34. The adhesive material 22 fills a cavity 38 defined by the panels 12, 18 and the inner surface 34, as well as a pair of substantially flat or linear interfaces (arrows A, B) between the panels 12, 18. For clarity, the interfaces (arrows A, B) are shown much larger or wider than they would actually appear subsequent to bonding, as will be understood by those of ordinary skill in the art. That is, once the panels 12, 18 have been bonded, the adhesive material 22 is squeezed or forced from the interfaces so that the panels 12, 18 are immediately adjacent to one another. Adhesive material 22 would remain in the cavity 38. The surface 28 of the outer panel 18 is oriented toward the first panel 12, with the layer of adhesive material 22 bonding thereto.

Still referring to FIG. 2, a residual stress area shown generally at 24 is present within the hemmed end 20 of the closure panel assembly 10. As used herein, the term "residual stress area" generally describes a localized area of relatively increased or elevated stress subsequent to hemming, conventional heat curing, and paint baking. Such residual stresses can result in perceivable surface distortion levels of approximately ±1 to 5 millimeters. Additionally, the residual stresses can result in elevated plastic strain, caused primarily by adhesive shrinkage occurring subsequently to the hemming process during inductive or intermediate heat curing. Accordingly, the assembly and method of the invention are provided to eliminate such heat curing from the fabrication process, as set forth below with reference to FIGS. 3 and 4.

Figure 4:
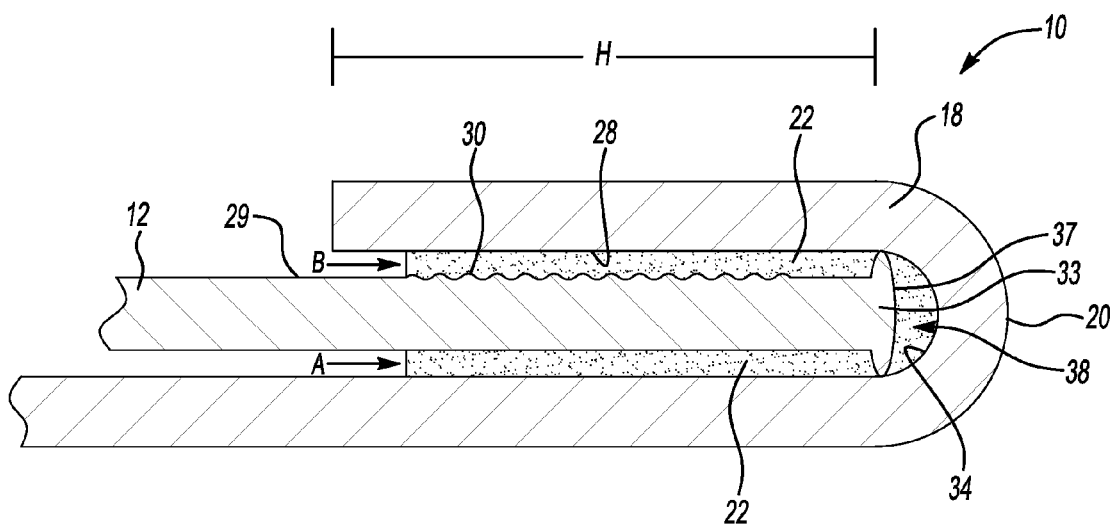
FIG. 4 is a schematic cross-sectional side view of a fully-fabricated vehicle closure panel assembly in accordance with an embodiment of the invention.

Referring to FIG. 3 in conjunction with FIG. 4, a fabrication process or method 100 is provided for minimizing or eliminating the distortion and plastic strain of the closure panel assembly 10 as described above. Beginning at step 102, an edge surface 37 of the inner panel 12 is at least partially crimped or otherwise deformed to form a crimped edge surface feature 33, such as by subjecting the edge surface 37 to a swaging process. As used herein, the term "swaging" describes a cold working metal forming technique in which the metal is plastically deformed to a final desired shape using a controlled application of high pressure, either by interposing the metal sheet between respective halves of a swage block or die and forcing the metal sheet to adapt to the features of the die, by hammering, or by other applied force.

At step 104, a relatively high frictional surface pattern or textured surface feature 30 is formed on a main surface 29 of the inner panel 12. The textured surface feature 30 can be formed in various ways, for example by subjecting the main surface 29 of the inner panel 12 to a coining process to thereby form a set of radial projections, bumps, asperities, or other desired surface feature as shown at the interface (arrow B) of FIG. 4. As used herein, the term "coining" refers to another cold working metal forming technique that also uses a great deal of force to plastically deform a workpiece, such as the outer panel 18, so the outer panel 18 conforms to a contour or shape of a die. Coining can be performed using a gear-driven press, a mechanical press, a hydraulically-actuated press, etc., and can provide either high relief or very fine features as required.

At step 106, a layer of adhesive material 22 is dispensed or applied to either or both of the respective first and second panels 12, 18 at the interfaces indicated by arrows A and B. As with FIG. 2, for purposes of clarity the interfaces indicated by arrows A and B are shown much larger or wider than they would actually appear after bonding is complete, i.e., after the adhesive material 22 has been forced or squeezed from the interfaces. Within the scope of the invention, the adhesive material 22 could be constructed of one or two polymers, such as an epoxy-based adhesive/sealer or other suitable material providing strong bonding capabilities at or along the interfaces indicated by arrows A and B in FIG. 4, while also providing strong sealing capabilities with relatively weak bonding capabilities within the cavity 38. Additionally, the adhesive material 22 may have a low rate or amount of shrinkage to minimize distortion at the hemmed end 20 as described above, with a maximum allowable adhesive shrinkage rate of less than approximately 5% by volume according to one embodiment.

At step 108, the outer panel 18 is hemmed to the inner panel 12 to thereby form the hem seam 14 (see FIG. 1) having the width H. In hemming the outer panel 18 to the inner panel 12, the textured surface feature 30 comes into frictional contact with the surface 28 of the outer panel 18 at or along the hem seam 14 at the interface indicated by arrow B, thereby providing a sufficient frictional interface between the adjacent panels 12 and 18. The combination of the crimped edge surface feature 33 and the textured surface feature 30 formed in accordance with the method 100 of FIG. 3 helps to affix, secure, or attach the panels 12, 18 together without requiring induction or intermediate heat curing of the adhesive material 22 prior to any subsequent finishing process, e.g., paint baking. The adhesive material 22 is then allowed to self-cure. The closure panel assembly 10 can then be painted, coated, and/or baked as needed depending on the particular design or intended use of the closure panel assembly 10. Those of ordinary skill in the art will recognize that the assembly and method set forth above can also be applied to hemming of three panel stack-ups. Likewise, by controlling or providing the adhesive material 22 with various bonding and sealing properties, the concept can be readily applied to steel inner panel/aluminum outer panel designs or other designs utilizing other dissimilar metals.

While the best modes for carrying out the invention have been described in detail, those familiar with the art to which this invention relates will recognize various alternative designs and embodiments for practicing the invention within the scope of the appended claims.

The invention claimed is:

1. A closure panel assembly comprising:
   a first panel having a main surface and an edge surface that is substantially perpendicular to the main surface, wherein the main surface defines a textured surface feature and the edge surface has a plastically-deformed crimped edge surface feature;
   a second panel; and
   a layer of adhesive material positioned between the textured surface feature of said first panel and said second panel, and between the crimped edge surface and the second panel;
   wherein said second panel is hemmed and adhesively bonded to said first panel to thereby form a hem seam having a hemmed edge with a bent inner wall, said hemmed edge at least partially enclosing the crimped edge surface feature of the first panel adjacent to said bent inner wall, such that said textured surface feature provides a frictional interface between said main surface of said first panel and said second panel at said hem seam and said crimped edge surface feature forms another frictional interface between said edge surface and said second panel adjacent to said bent inner wall, thereby affixing said first panel to said second panel without heat curing said layer of adhesive material.

2. The closure panel assembly of claim 1, wherein said textured surface feature includes one of a set of radial surface projections and a set of surface asperities.

3. The closure panel assembly of claim 1, wherein at least one of said first panel and said second panel is constructed substantially of aluminum.

4. The closure panel assembly of claim 3, wherein said layer of adhesive material is epoxy-based and has a shrinkage level of less than approximately 5% by volume.

5. A vehicle hood panel assembly comprising:
   an inner hood panel having a main surface and an edge surface that is substantially perpendicular to said main surface, wherein said main surface defines a textured surface feature and said edge surface defines a plastically-deformed crimped edge surface feature;
   an outer hood panel; and
   a layer of adhesive material positioned between the textured surface of the inner hood panel and said outer hood panel, and between the crimped edge surface feature and the outer hood panel;
   wherein said outer hood panel is hemmed and adhesively bonded to said inner hood panel using said layer of adhesive material to thereby form a hem seam having a bent inner wall, said hem seam at least partially enclosing said crimped edge surface feature of the inner hood panel at a distal end of said inner hood panel adjacent said bent inner wall, said textured surface feature and said crimped edge surface feature each forming a frictional interface between the inner and outer panels sufficient for affixing said inner hood panel to said outer hood panel at said hem seam without heat curing said layer of adhesive material.

6. The vehicle hood panel assembly of claim 5, wherein said outer hood panel is resistance welded to said inner hood panel along said hem seam.

7. The vehicle hood panel assembly of claim 5, wherein each of said inner hood panel and said outer hood panel are each constructed at least partially of aluminum.

8. The vehicle hood panel assembly of claim 5, wherein said textured surface feature is one of: a set of radial projections extending from said inner hood panel and a set of surface asperities formed on said inner hood panel.

9. The vehicle hood panel assembly of claim 5, wherein said layer of adhesive material has a shrinkage rate of less than approximately 5% by volume.

10. The vehicle hood panel assembly of claim 9, wherein said layer of adhesive material is constructed at least partially of epoxy.

11. A method of forming a closure panel assembly, the method comprising:

forming a textured surface feature on a first surface of a first closure panel, wherein the first surface is a main surface of the first closure panel;

forming a crimped edge surface feature on a second surface of said first closure panel, wherein the second surface is an edge surface of the first closure panel that is substantially perpendicular to said main surface;

applying a layer of adhesive material to the textured surface feature of the first panel; and hemming said second panel to said first panel to thereby form a hem seam having a hemmed edge defined by a bent inner wall of the second panel, with the hemmed edge at least partially enclosing said crimped edge surface feature of the first closure panel adjacent to the bent inner wall, such that said textured surface feature and said crimped edge surface feature each form a frictional interface between the first and second closure panels for affixing said first closure panel to said second closure panel without heat curing of said layer of adhesive material.

12. The method of claim 11, wherein the closure panel assembly is configured as a vehicle hood panel assembly.

13. The method of claim 11, wherein forming a crimped edge surface feature includes subjecting said second surface of said first panel to a swaging process, and wherein forming a textured surface feature includes subjecting said first surface of said first panel to a coining process to thereby form a set of radial projections.

14. The method of claim 11, further comprising resistance welding said first panel to said second panel along said hem seam.

15. The method of claim 11, wherein said resistance welding includes spot-welding.

16. The method of claim 11, wherein forming a crimped edge surface feature on a second surface of said first closure panel includes subjecting the second surface to a swaging process.

* * * * *